(12) United States Patent
Donzis et al.

(10) Patent No.: US 12,712,672 B2
(45) Date of Patent: Aug. 18, 2026

(54) BITMAP-BASED ROUTING

(71) Applicant: PERFTECH, INC., San Antonio, TX (US)

(72) Inventors: Lewis T. Donzis, San Antonio, TX (US); Ryan M. Matelske, San Antonio, TX (US); John Anthony Murphy, San Antonio, TX (US)

(73) Assignee: PERFTECH, INC., San Antonio, TX (US)

( * ) Notice: Subject to any disclaimer, the term of this patent is extended or adjusted under 35 U.S.C. 154(b) by 292 days.

(21) Appl. No.: 18/620,892

(22) Filed: Mar. 28, 2024

(65) Prior Publication Data

US 2025/0310033 A1 Oct. 2, 2025

(51) Int. Cl.
*H04L 1/1607* (2023.01)
*H04L 45/745* (2022.01)

(52) U.S. Cl.
CPC .......... *H04L 1/1614* (2013.01); *H04L 45/745* (2013.01)

(58) Field of Classification Search
None
See application file for complete search history.

(56) References Cited

U.S. PATENT DOCUMENTS 9,612,841 B1 * 4/2017 Stark .................. G06F 9/30069
2013/0016708 A1 * 1/2013 Haba .................... H04W 48/16 455/7
2017/0126588 A1 * 5/2017 Anand .................... H04L 47/31
2021/0092786 A1 * 3/2021 Uddin .................. H04W 76/15
2021/0160275 A1 * 5/2021 Anderson ........... H04L 63/1458
2021/0160350 A1 * 5/2021 Volpe .................... H04L 67/563
2025/0240187 A1 * 7/2025 Dejanovic ........... H04L 12/6418
2025/0307172 A1 * 10/2025 Calvert ............... H04L 49/3063

* cited by examiner

*Primary Examiner* — Christopher M Crutchfield

(57) ABSTRACT

An example operation may include one or more of establishing a connection with a network via an apparatus comprising a plurality of network connection ports, wherein each network connection port is configured to provide an internet connection or an internal local area network connection, receiving a packet comprising a bitmap via an ingress network connection port of the plurality of network connection ports, executing one or more checks associated with the packet and identifying metadata attributes of the packet, and updating the bitmap to include the metadata attributes of the packet.

20 Claims, 15 Drawing Sheets

100
110
111
112
Web Server
Web Server
Web Server
Network 120
121
122
123
124
125
Router
Router
Router
Router
Router
130
Switch
140
142
User Device
User Device

Figure 2:
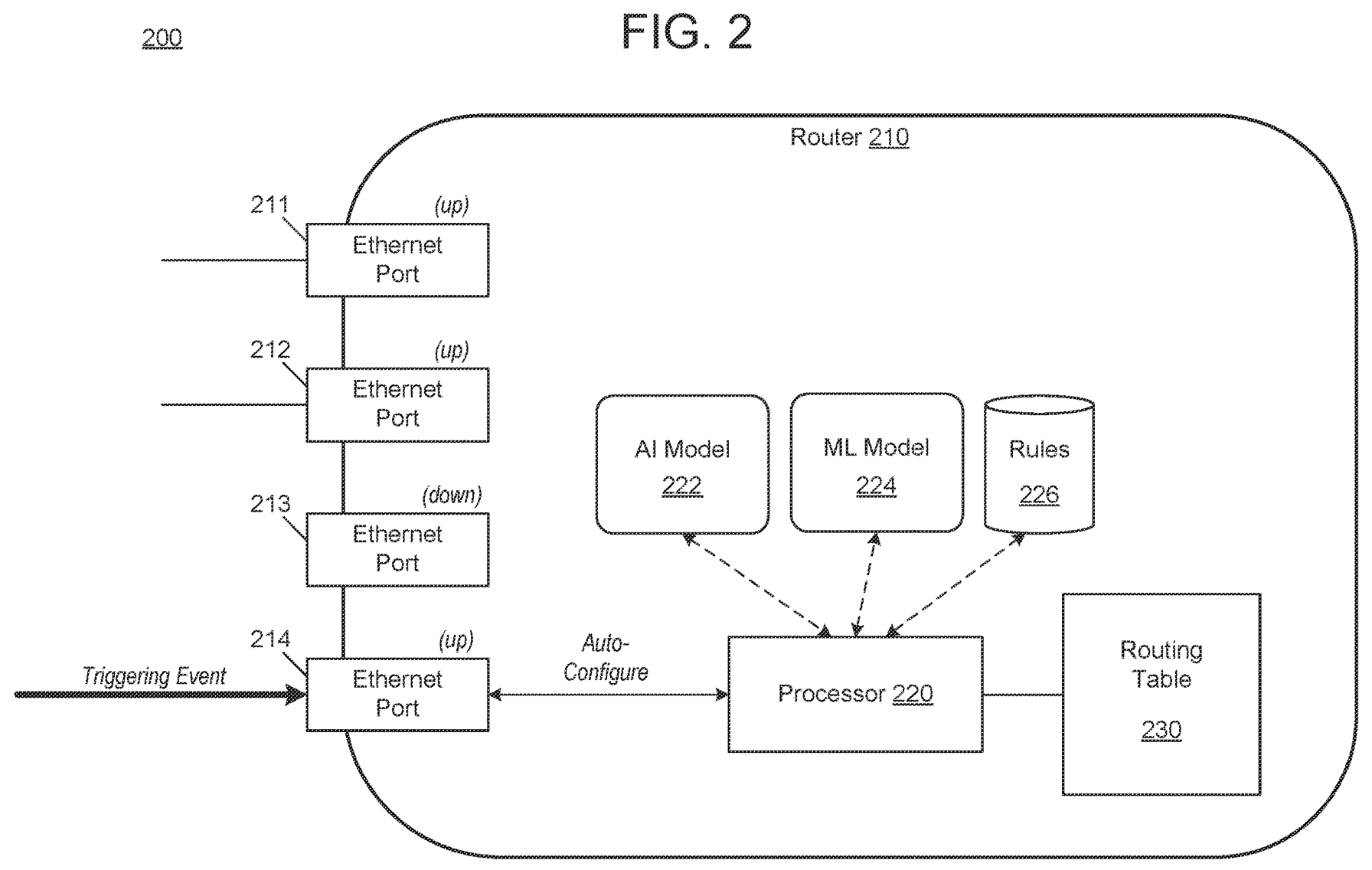

Router 210

AI Model 222

ML Model 224

Rules 226

Processor 220

Routing Table 230

Auto-Configure (up) Ethernet Port 211

(up) Ethernet Port 212

(down) Ethernet Port 213

(up) Ethernet Port 214

Triggering Event

Figure 3A:
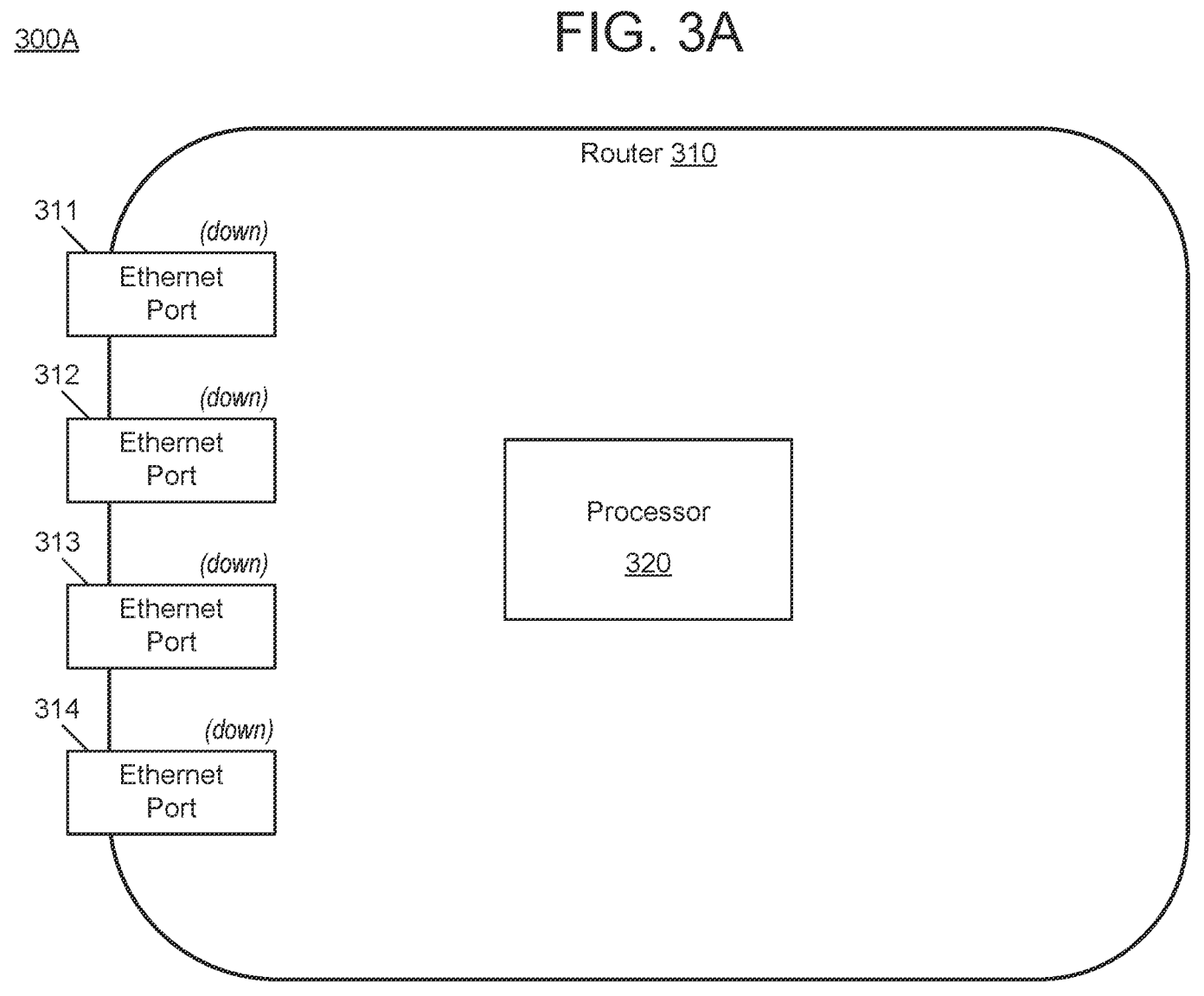

Router 310

Processor
320

311 (down) Ethernet Port 312 (down) Ethernet Port 313 (down) Ethernet Port 314 (down) Ethernet Port

Figure 3B:
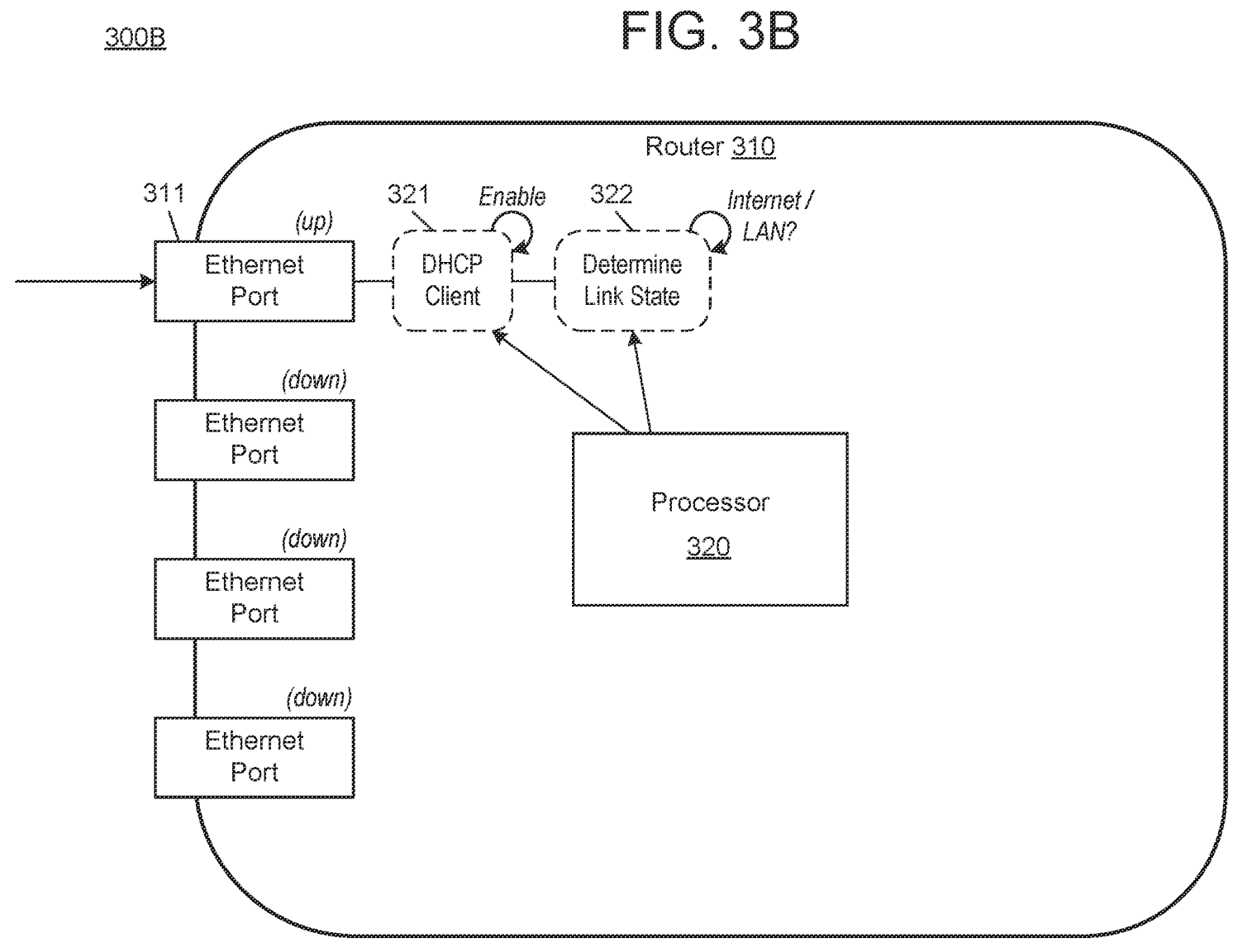

Router 310

Ethernet Port (up) 311

Ethernet Port (down)

Ethernet Port (down)

Ethernet Port (down)

DHCP Client 321

Enable

Determine Link State 322

Internet / LAN?

Processor 320

Figure 3C:
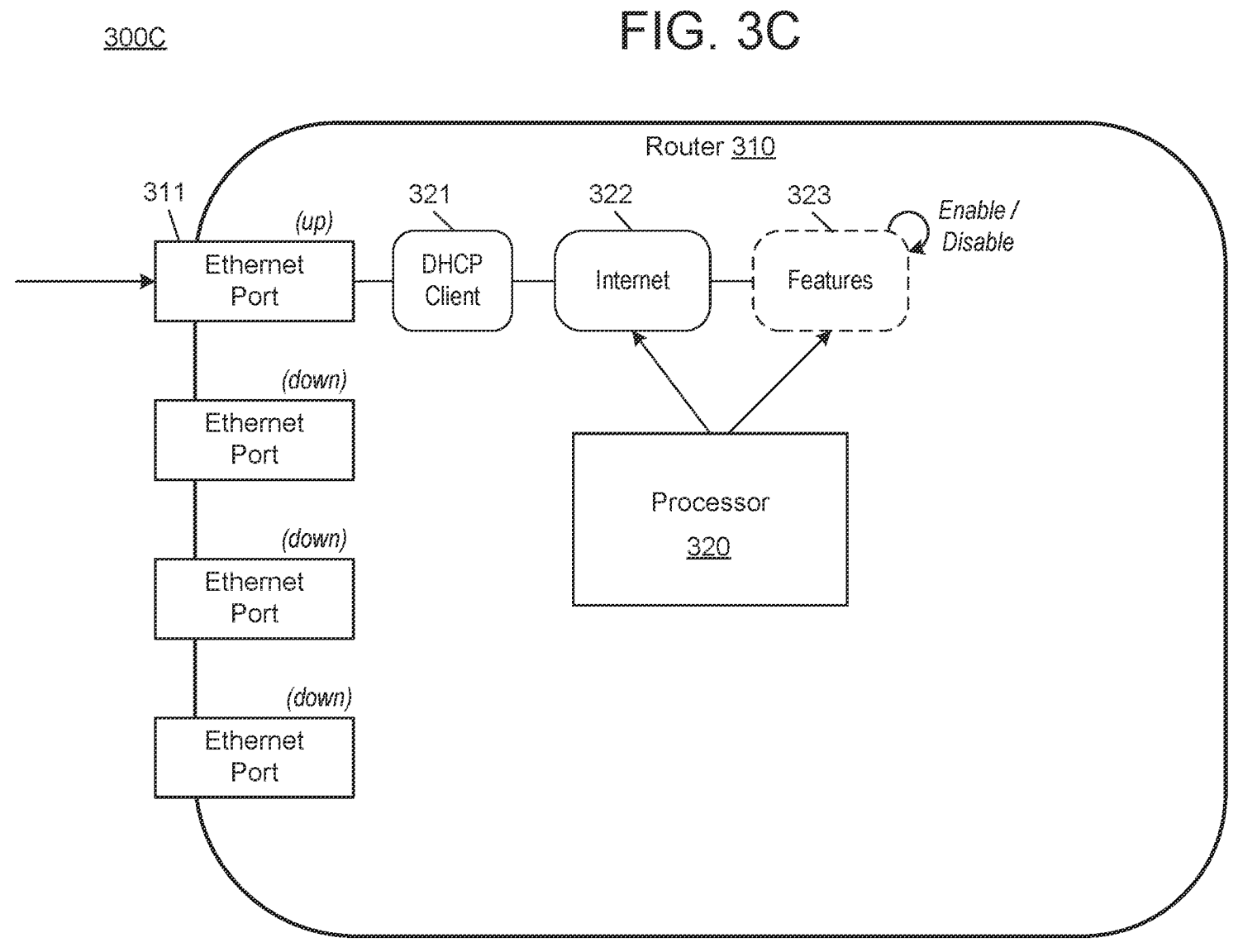

Router 310

311
Ethernet Port
(up)

Ethernet Port
(down)

Ethernet Port
(down)

Ethernet Port
(down)

321
DHCP Client

322
Internet

323
Features

Enable / Disable

Processor
320

Figure 3D:
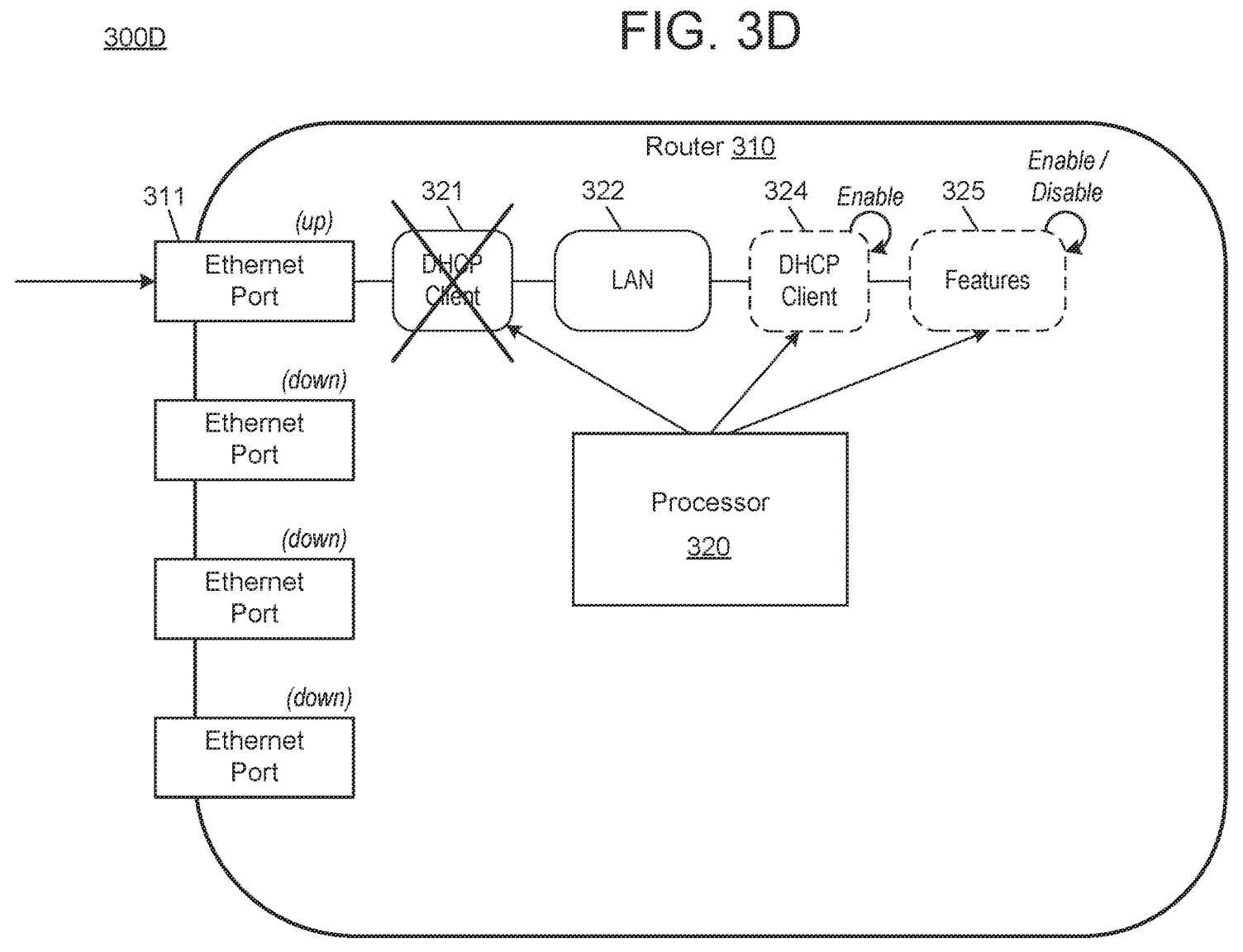

Router 310

311 Ethernet Port (up)

Ethernet Port (down)

Ethernet Port (down)

Ethernet Port (down)

321 DHCP Client

322 LAN

324 DHCP Client

Enable

325 Features

Enable / Disable

Processor 320

Figure 3E:
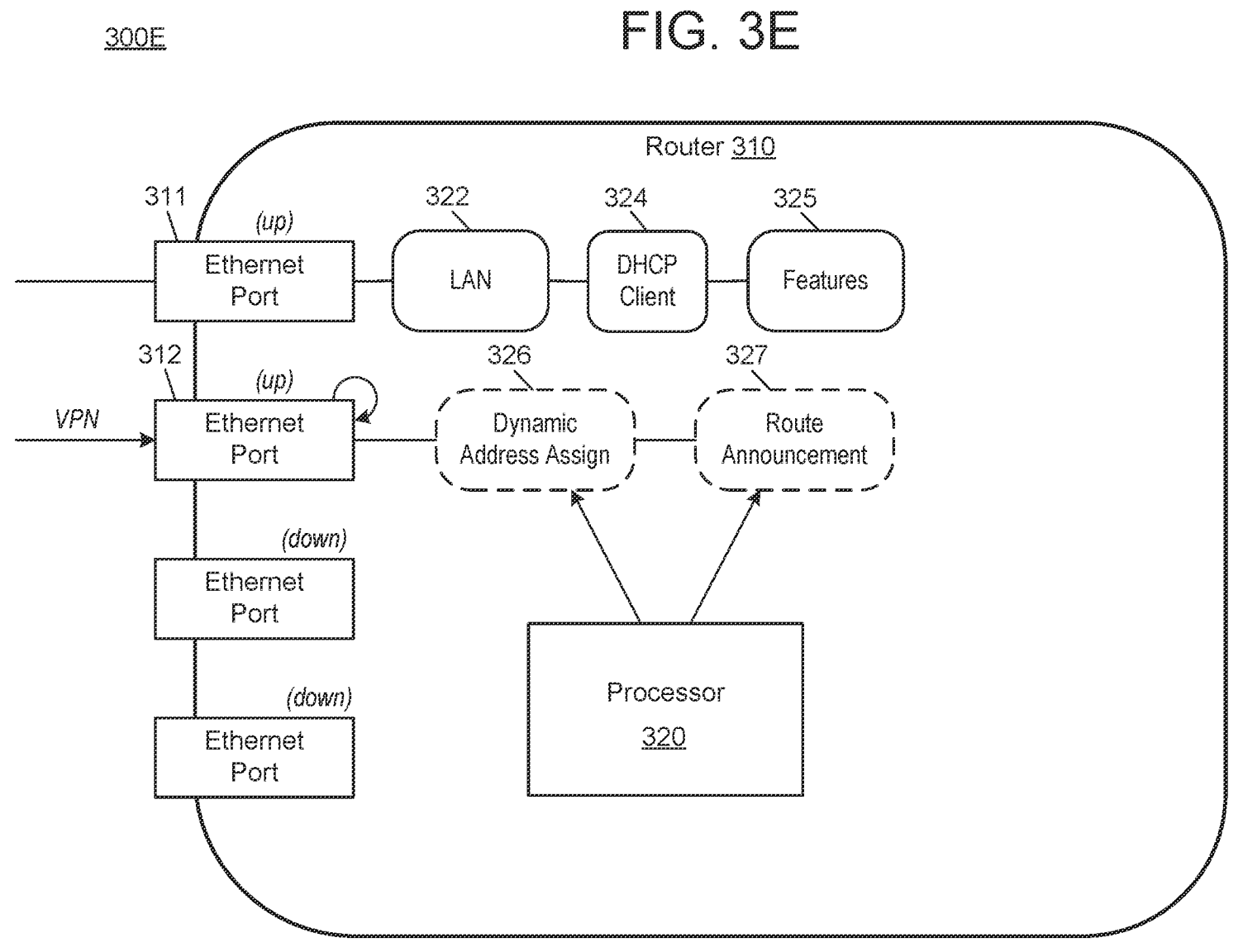

Router 310

311 (up) Ethernet Port 312 (up) Ethernet Port

VPN (down) Ethernet Port (down) Ethernet Port

322 LAN

324 DHCP Client

325 Features

326 Dynamic Address Assign

327 Route Announcement

Processor 320

Figure 3F:
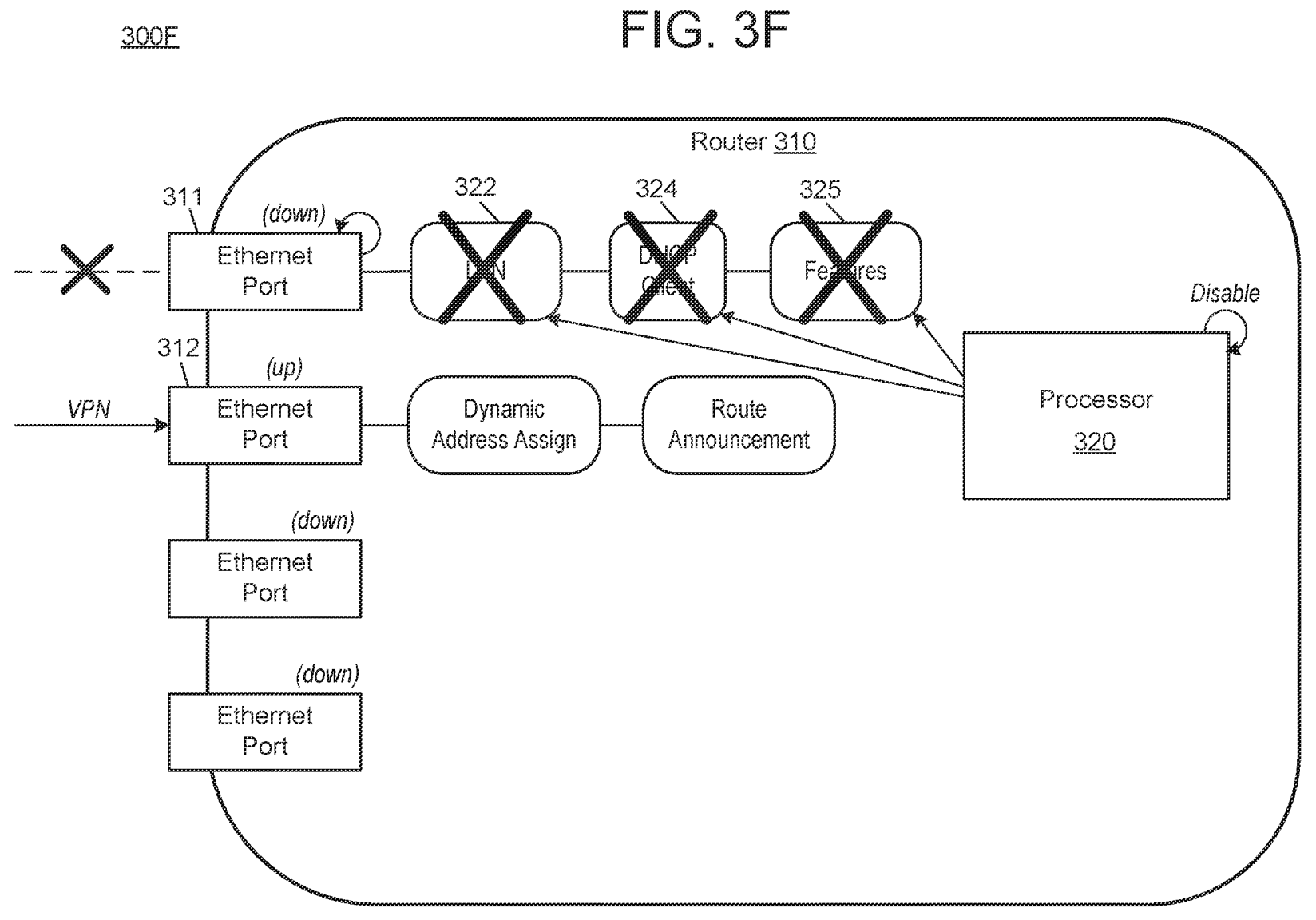

Router 310

Disable

Processor
320

325

324

322

Route
Announcement

Dynamic
Address Assign (down)
Ethernet
Port (up)
Ethernet
Port (down)
Ethernet
Port (down)
Ethernet
Port

311

312

VPN

Figure 4:
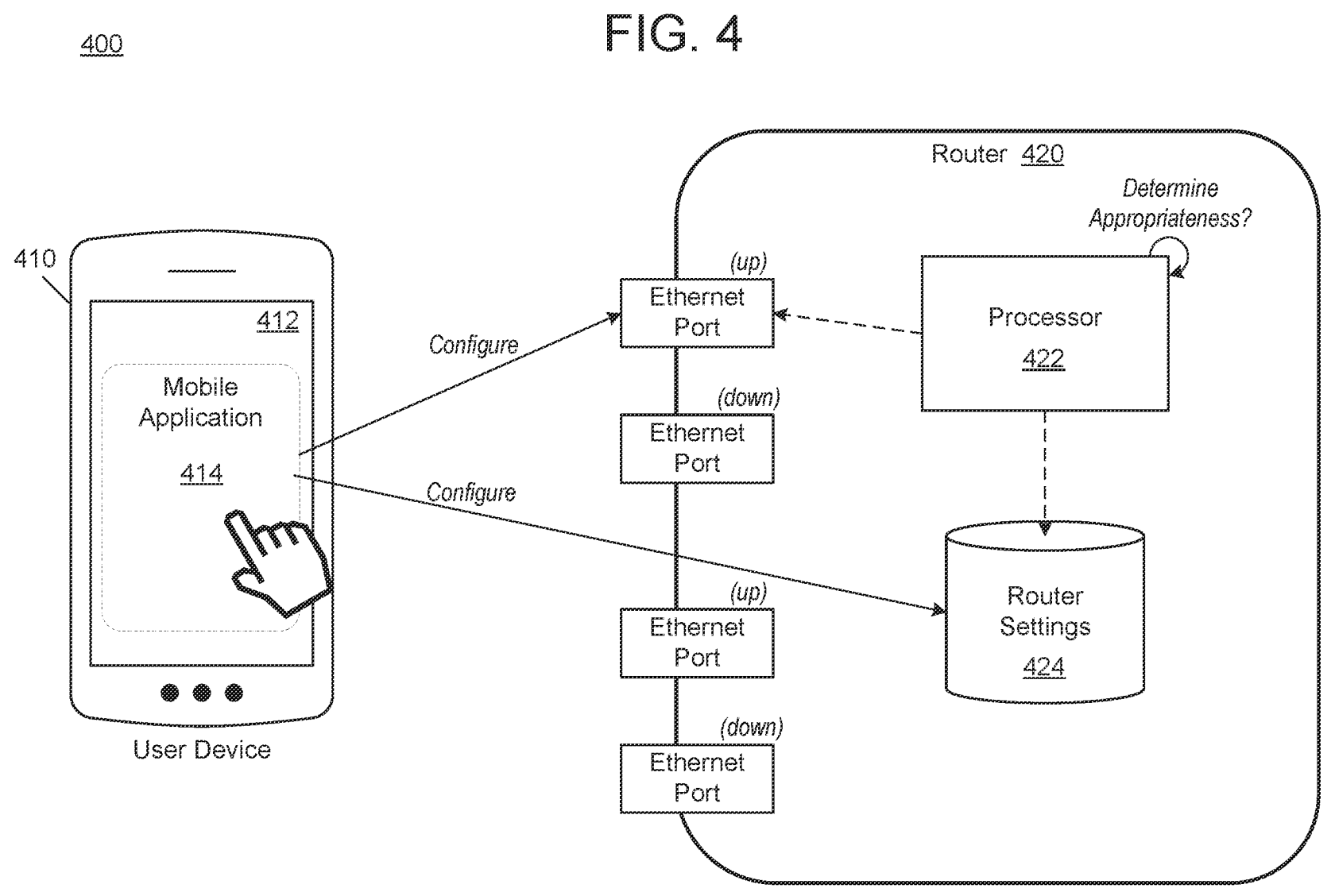

Router 420

Determine Appropriateness?

Processor 422

Router Settings 424

(up) Ethernet Port (down) Ethernet Port (up) Ethernet Port (down) Ethernet Port

Configure

Configure

412

Mobile Application 414

User Device

Figure 5B:
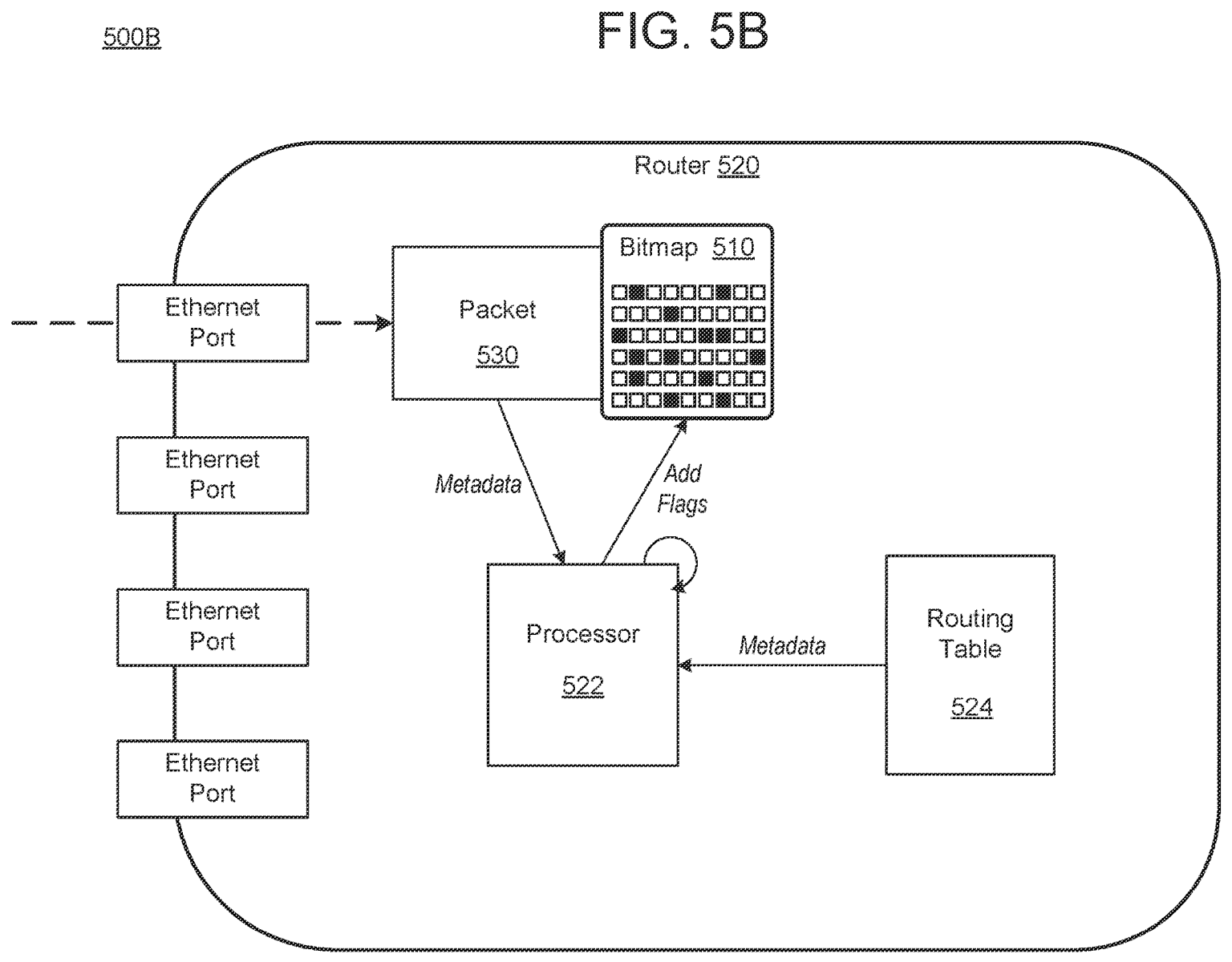

Router 520

Bitmap 510

Packet 530

Add Flags

Metadata

Processor 522

Metadata

Routing Table 524

Ethernet Port

Ethernet Port

Ethernet Port

Ethernet Port

Figure 5C:
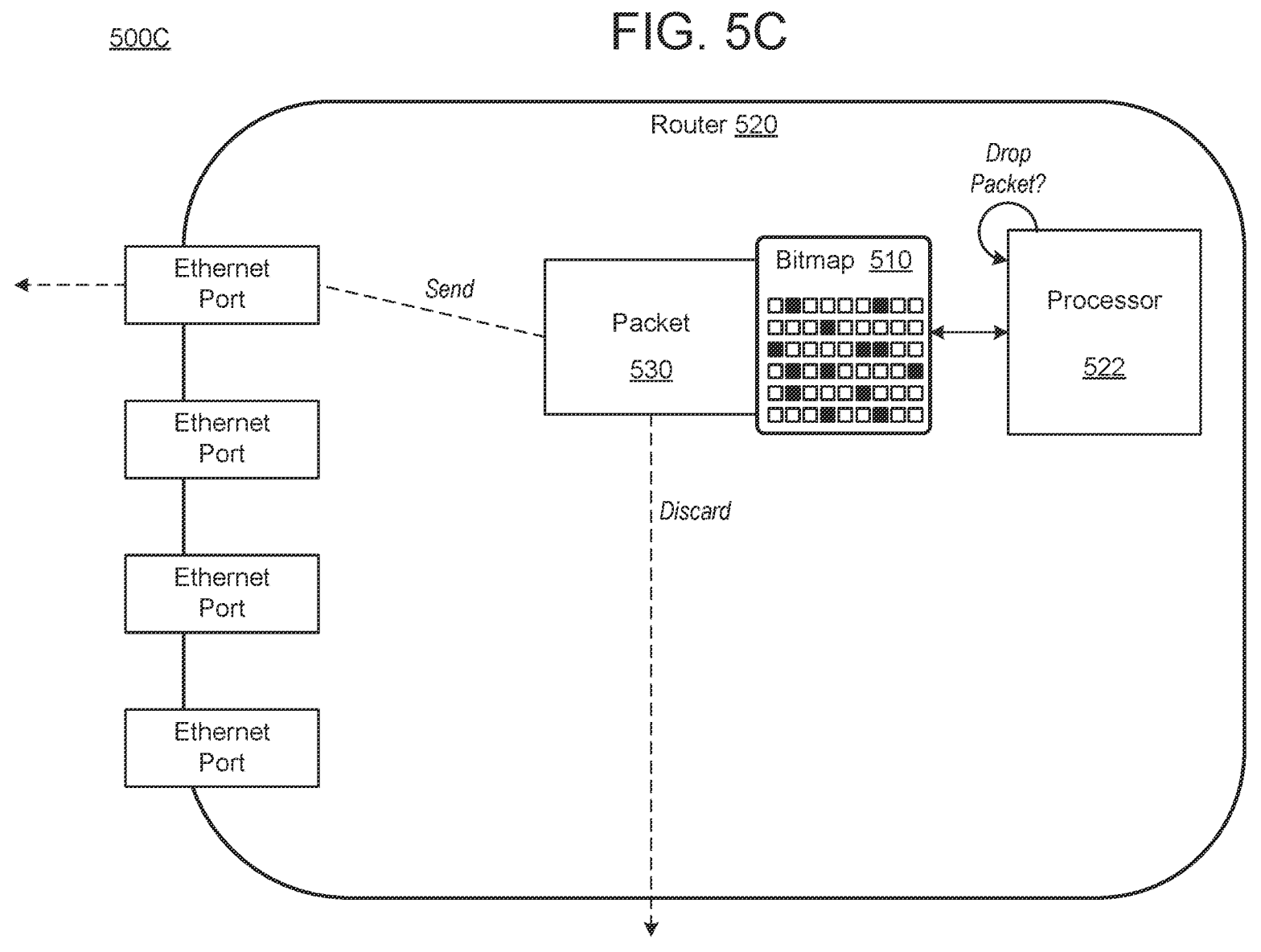

Router 520

Processor 522

Drop Packet?

Bitmap 510

Packet 530

Discard

Send

Ethernet Port

Ethernet Port

Ethernet Port

Ethernet Port

600

700

BITMAP-BASED ROUTING

BACKGROUND

One of the benefits of a router is that it allows for connectivity between different devices and networks. For example, multiple devices can be connected to the Internet and to each other through a single router. In a home environment, a router can connect multiple devices such as laptops, smartphones, tablets, televisions, smart wearables, vehicles, and the like, to the Internet and allow them to communicate with each other. In a business environment, routers can be used to connect multiple computers and servers to the Internet and to each other, allowing for seamless communication between employees and users outside the business.

Configurations in networks play a critical role as they keep networks fully functioning and free from downtime. However, managing the configurations of a router typically requires a human (e.g., an admin, etc.) to make changes at regular intervals of time. But a person requires time to update the router, and even then, the person may fail to identify security flaws or make the correct security changes.

SUMMARY

One example embodiment provides an apparatus that includes one or more of a plurality of network connection ports, wherein each network connection port is configured to provide an internet connection or an internal local area network connection, and a processor configured to receive a packet comprising a bitmap via an ingress network connection port of the plurality of network connection ports, execute one or more checks associated with the packet to identify metadata attributes of the packet, and update the bitmap to include the metadata attributes of the packet.

Another example embodiment provides a method that includes one or more of establishing a connection with a network via an apparatus comprising a plurality of network connection ports, wherein each network connection port is configured to provide an internet connection or an internal local area network connection, receiving a packet comprising a bitmap via an ingress network connection port of the plurality of network connection ports, executing one or more checks associated with the packet and identifying metadata attributes of the packet, and updating the bitmap to include the metadata attributes of the packet.

A further example embodiment provides a computer-readable medium comprising instructions, that when read by a processor, cause the processor to perform one or more of establishing a connection with a network via an apparatus comprising a plurality of network connection ports, wherein each network connection port is configured to provide an internet connection or an internal local area network connection, receiving a packet comprising a bitmap via an ingress network connection port of the plurality of network connection ports, executing one or more checks associated with the packet and identifying metadata attributes of the packet, and updating the bitmap to include the metadata attributes of the packet.

BRIEF DESCRIPTION OF THE DRAWINGS

FIG. 2 is a diagram illustrating a process of a routing apparatus self-configuring a state thereof according to example embodiments.

FIGS. 3A-3F are diagrams illustrating processes for reconfiguring a state of a routing apparatus according to example embodiments.

FIG. 4 is a diagram illustrating a process of analyzing manual changes to a routing apparatus according to example embodiments.

FIGS. 5A-5C are diagrams illustrating a process of analyzing a packet and updating a bitmap based on metadata according to example embodiments.

DETAILED DESCRIPTION

Figure 1A:
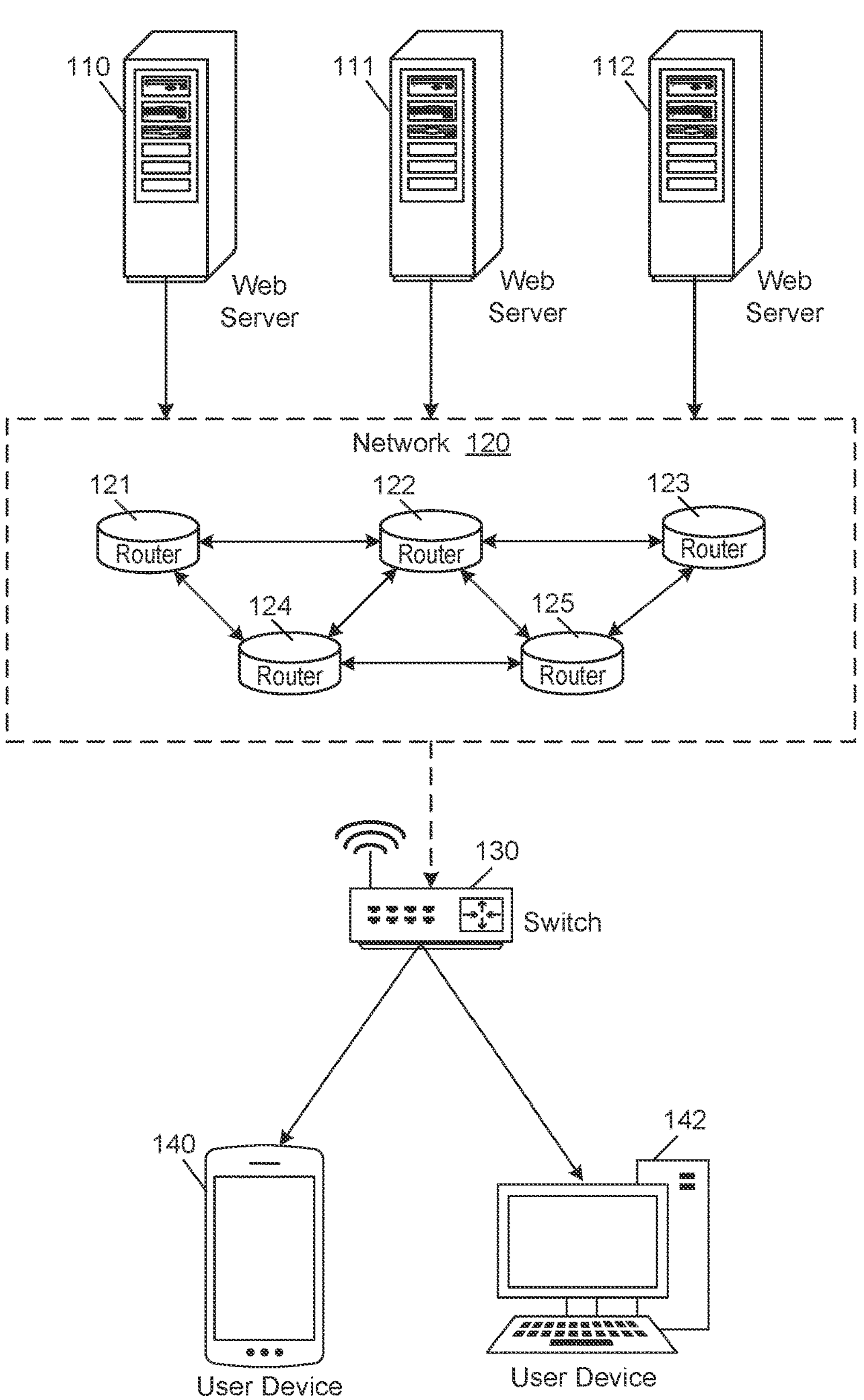
FIG. 1A is a diagram illustrating a network computing environment including a plurality of routing apparatuses according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a routing apparatus (also referred to herein as a router, etc.) The router may be geared for gigabit Internet, and also designed to accommodate future generation speeds. For example, the router may include multiple Ethernet ports that have a 1 Gbps Ethernet capacity or more. The router may enable thousands of connected devices and may collect and store activity data of the connected devices. The router may include a dual-channel memory and may support both Internet Protocol version four (IPv4) which uses a 32-bit address and Internet Protocol version six (IPv6) which uses a 128-bit address. The router can support multiple separate local area networks (LANs) at the same time, may isolate a guest Wireless Fidelity (WiFi) network, and may support multiple virtual LANs (VLANs) with automatic internal mapping. The router may assign each connected device an IP address. The router may perform port forwarding by device name. The router may also support multiple Internet connections for redundancy and load balancing.

The router may include a built-in firewall, and may protect all devices from threat-ware, malware, phishing, ransomware, and viruses. The router may be configured to pause Internet access to any device. Furthermore, the router may be configured to temporarily quarantine a new device when it joins the network. The router may perform content filtering, web search filtering, safe search, intrusion prevention, and the like. The router may also perform automatic virtual private network (VPN) self-configuring, and the like.

According to various embodiments, there is provided a self-configuring router. The router is capable of diagnosing changes to network connections which are connected to the router, and configuring the router based on the such changes. The process eliminates or otherwise significantly reduces a need for a person (e.g., an administrator, etc.) to make such configuration changes to the router. The process can be performed in real-time or near real-time thereby eliminating downtime that often occurs when a human makes such configuration changes. Furthermore, the process is automated and reduces the errors that can be introduced by humans due to lack of issue spotting, etc.

The self-configuring process may be triggered by various changes in state to the operating environment of the router including the router being initialized, an Ethernet port going from inactive to active, or vice-versa, an Ethernet port changing in some way such as a new IP address, an external gateway being activated or deactivated, changes within a routing table of the router, and the like. Once triggered, the auto-configuration process may rely on predefined rules, machine learning, artificial intelligence (AI), and the like, to self-configure the router settings. The process can consider various environmental factors such as the number of physical Ethernet connections that are active, the number of available Internet connections, the types of Internet connections available (e.g., IPv4 versus IPv6, etc.)

According to various embodiments, there is also provided a router that can manage a packet using a bitmap that is attached to the packet. Traditionally, routers examine aspects of each packet as it passes from ingress to egress, in order to make decisions along the way and for security purposes. For example, a router may drop a packet that is malformed or malicious and could cause harm. Rather than rely on the router to keep track of each of these security decisions through traditional means, the example embodiments can use a "wide bitmap" of metadata attributes that is attached to each packet. The bitmap may store bit flags (flags) that identify whether or not a packet has numerous qualities of the protocol stack including layer 2 (L2) protocol, layer 3 (L3) protocol, layer 4 (L4) protocol, and layer 7 (L7) protocol.

For example, for purpose of layer 2 analysis, the bitmap could contain a flag that identifies whether the packet has been received promiscuously. The flag may be set by the router by analyzing a routing table, metadata within the packet itself, a source of the packet, etc. As another example, for purposes of layer 3 analysis, the bitmap could contain a flag that indicates whether the packet is IPv4 or IPv6, and whether it's destined for "this" device. As another example, for purposes of layer 4 analysis, the bitmap could contain a flag that identifies whether the packet contains TCP, UDP, ICMP, or other data. Further, a layer 7 analysis may include identifying whether the packet contains TLS handshake data.

Furthermore, the bitmap may also include flags that are unrelated to protocol layers but which provide internal information, such as the trustworthiness of the packet due to its method of ingress, as well as instructions such as to whether it should be dropped, or whether it needs to be translated. The net effect of this method is that packets can be processed very efficiently. For example, in order to determine whether a packet contains an ICMP "ping" that is directed to the device, the flags "IP", "ICMP echo request", and "destined to my IP" can all be tested simultaneously and efficiently.

The bitmap enables the router to simultaneously perform multiple checks on the packet for Layer 2, Layer 3, Layer 4, Layer 7, and the like. The bitmap can be very efficient because the router may be limited to checking a finite number of protocol issues and other features rather than a traditional router which may check thousands of possible issues. For example, the router may only be interested in checking 65-70 aspects of the packet, rather than a traditional router that can check for tens of thousands of potential issues many of which are related to where the packet is going on the Internet. Thus, by reducing the issues of concern and relying on a bitmap to track the limited set of issues, the router can perform the checking process much faster. Furthermore, the router can use the flags set within the bitmap to determine whether or not to drop the packet.

FIG. 1A illustrates a network computing environment 100 including a plurality of routing apparatuses (e.g., routers) according to example embodiments. Referring to FIG. 1A, the network computing environment 100 includes a plurality of web servers that provide content to a plurality of user devices. In this example, a web server 110, a web server 111, and a web server 112 may provide different types of content including emails, videos, chat, social media, video games, and the like, to a user device 140 and a user device 142 via a network of routers 120. In this example, the network of routers 120 includes a router 121, a router 122, a router 123, a router 124, and a router 125. Any of the routers within the network of routers 120 may embody the self-configuring and bitmap management processes described herein.

For example, the web server 110 may send packets of data to the user device 140 via the network of routers 120. In this example, one or more of the routers in the network of routers 120 may receive and route the packets until it reaches the user device 140. For example, a router 121 may receive the packets from the web server 110 and route the packets to the router 124. Here, the router 121 may select/choose the best path for the packets through the network. In response to receiving the packets, the router 124 may then route the packets to a switch 130, which then delivers the packets to the user device 140. The source and destination of the packets may be included in the packets and may be used by the network of routers 120 and the switch 130 to deliver the packet to the appropriate device (the user device 140).

Each of the routers in the network of routers 120 may store a routing table which includes all of the available paths in the network of routers 120. A router may look at the destination IP address in the packet and determine the fastest path through the network of routers 120 based on the routing table and metric values determined by the router.

The example of FIG. 1A could refer to a home environment or the like. It should also be appreciated that the routers described herein may be used in an office environment. In this example, the routers may connect not only user devices, but also other servers, and the like.

Figure 1B:
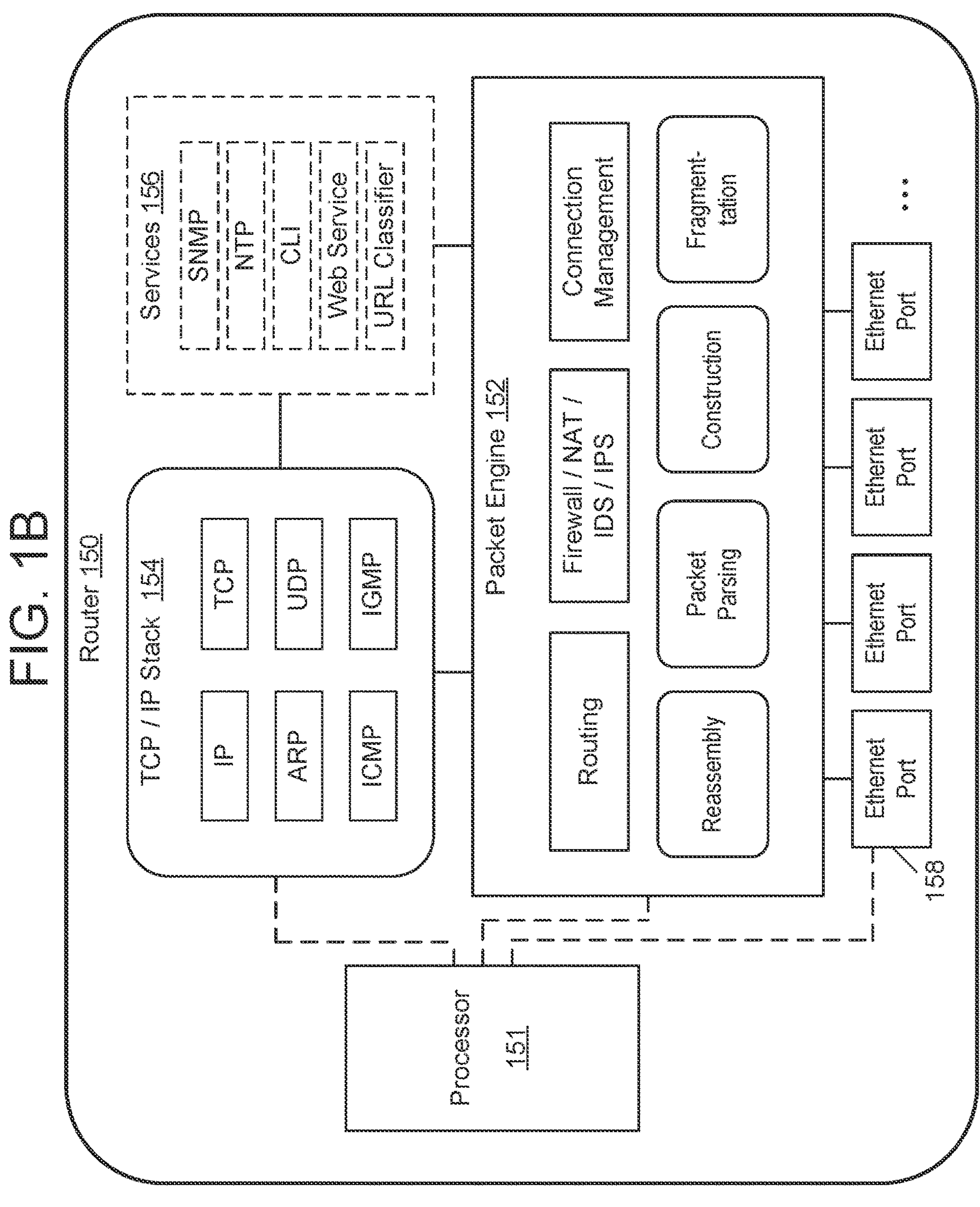
FIG. 1B is a diagram illustrating components that may be included in a routing apparatus according to example embodiments.

FIG. 1B illustrates components that may be included within a routing apparatus (i.e., a router 150) according to example embodiments. Referring to FIG. 1B, the router 150 includes a processor 151 such as a central processing unit (CPU) that helps each of the other components of the router 150 perform their function. The router 150 also includes a packet engine 152, a transmission protocol/Internet protocol (TCP/IP) stack 154, and a plurality of Ethernet ports 158. In this example, the packet engine 152 is responsible for processing packets as they are received through an ingress port (e.g., an Ethernet port 158) and output via an egress port. The TCP/IP stack 154 is responsible for ensuring that various protocols are enforced on packets from ingress to egress. The packet engine 152 and/or the TCP/IP Stack 154 may perform services 156 on packets that pass through the router 150 including, but not limited to, implementing a Simple Network Management Protocol (SNMP), implementing Network Time Protocol (NTP), providing and managing a command line interface (CLI), managing a web service that is accessible to external devices, and a uniform resource locator (URL) classifier.

According to various embodiments, the packet engine 152 may perform routing on a packet based on a destination IP address of the packet, may implement a firewall, perform network address translation (NAT), perform an intrusion detection system (IDS), perform an intrusion prevention system (IPS), and the like. The packet engine 152 may also perform a connection management function to control automatic failover, monitor client connections, direct requests to appropriate servers, act as a proxy server, handle client/server communications, and prioritize connections between application servers. The packet engine 152 may also perform reassembly on fragments of a packet as it arrives and apply ACLs and NATs to the packet once it is reassembled, packet parsing, construction, and fragmentation of packets into smaller pieces so that resulting pieces can pass through a link with a smaller maximum transmission unit.

In some embodiments, the packet engine 152 may also manage autoconfiguration for IPv4 which enables devices to connect to the Internet and automatically assign themselves an IP address, device management which displays views of router configuration and performance such as to an external device, virtual private networks (VPNs), routing information protocol (RIP), Universal Plug and Play (UPnP) to enable compliant devices to automatically set port forwarding rules, simple service discovery protocol (SSDP) which enables a device to advertise its services to other devices, a domain name service (DNS) which enables translation of domain names to machine-readable IP addresses, a hostname cache which can be used by the DNS store hostnames and IP address pairings, category enforcement which enables blocking of categories of DNS, device pause, and the like.

Furthermore, the packet engine 152 may also control and manage dynamic host configuration protocol (DHCP) including DHCP client and DHCP server functions. DHCP can be used to assign IP addresses to DHCP clients and allocate TCP/IP configuration information to DHCP clients. This information includes subnet mask information, default gateway IP addresses, and domain name system (DNS) addresses. In some embodiments, the router 150 may serve as a DHCP server that assigns IP addresses to clients connected to the router 150.

In one embodiment, the system integrates machine learning algorithms into a router's packet engine component. The processor within the router, responsible for executing checks on incoming packets, is enhanced to incorporate machine learning models trained to detect anomalies or potential security threats within network traffic. Upon receiving a packet via an ingress network connection port, the processor executes traditional checks to identify metadata attributes and pass the packet data through machine learning algorithms. These algorithms analyze the packet content, patterns, and behaviors to assess whether it contains any indications of malicious activity or deviations from normal network behavior. If the machine learning models detect suspicious patterns, the router generates alerts or takes proactive measures, such as blocking the packet or quarantining the associated device. Additionally, the router periodically sends updates to a centralized server, providing insights into emerging threats or new patterns of malicious activity observed across the network.

In one embodiment, the apparatus comprises a plurality of network connection ports and a processor. Upon receiving a packet via an ingress network connection port, the processor begins the process by executing checks associated with the packet. The checks involve examining various attributes of the packet, such as source and destination IP addresses, packet size, protocol type, and payload content. The processor identifies metadata attributes of the packet based on the results of these checks. Metadata attributes may include packet type, priority, security level, and routing information. Once the metadata attributes are identified, the processor updates a bitmap to include these attributes. The bitmap serves as a data structure that represents the characteristics of packets currently traversing the network. Messages exchanged between the components involve data packets being passed from the network connection ports to the processor for analysis, with the processor sending control signals to update the bitmap based on the identified metadata attributes. Additionally, the processor may generate status messages indicating the completion of the analysis process or any errors encountered during the checks. The status messages are sent to a management interface for monitoring and troubleshooting purposes.

FIG. 2 illustrates a process 200 of a router 210 self-configuring its state according to example embodiments. For example, the router 210 may automatically diagnose a change to an operating state of the router 210 and automatically configure/re-configure settings of the router 210 based on the diagnosis. Referring to FIG. 2, the router 210 includes a plurality of Ethernet port 211, 212, 213, and 214. In this example, the Ethernet port 211 and Ethernet port 212 are already up and active. Here, a change in state occurs when a new connection is made with Ethernet port 214. For example, the connection may occur when a new device is plugged into the port, a device is turned on, a device changes state, or the like. In response, a processor 220 may automatically configure the Ethernet port 214 based on the change in state. As another example, a change may include a change to a routing table 230, a change in a state of a device already linked/connected to an Ethernet port, or the like.

According to various embodiments, the processor 220 may execute one or more of an artificial intelligence (AI) model 222, a machine learning model 224, predefined rules 226, or the like, to determine the how to further configure the router (such as the settings of the Ethernet port 214) based on environmental conditions such as a number of physical Ethernet connections that are active, a number of available Internet connections, the types of available Internet connections (e.g., IPv4, IPv6, etc.), and the like. In the example of FIG. 2, the diagnosing and configuring is performed by the processor 220. However, it should also be appreciated that the diagnosing and the configuring may be performed by the packet engine, the TCP/IP stack, a combination thereof, and the like.

According to various embodiments, the triggering event could include various different changes to state. For example, the triggering event may include an initial system initialization, a connection port that goes from active to inactive (up to down) or from inactive to active (down to up). As another example, the triggering event may include a configuration of a network connection port, including but not limited to its IP address, the reason for its IP address (e.g., DHCP, static, etc.), being designated as primary or backup, or any of numerous other configurable parameters. As another example, the triggering event may include a network connection port being removed or being added. As another example, the triggering event may include an external gateway's up/down state changing. As another example, changes to the routing table may include the triggering event such as changes in the routes/paths to other devices on the network, and the like.

FIGS. 3A-3F illustrate examples of processes for reconfiguring a state of a routing apparatus according to example embodiments. For example, FIG. 3A illustrates a process 300A of a router 310 that has not been initialized or received an incoming connection. In this example, the router 310 includes a processor 320 which performs the auto-configuration of the router based on a change in state to the router 310. Here, the router 310 includes four Ethernet ports including an Ethernet port 311, an Ethernet port 312, an Ethernet port 313, and an Ethernet port 314. In this example, each of the Ethernet ports are down (inactive). Although not shown in FIG. 3A, it should be appreciated that the auto-configuration may be performed by a packet engine (such as the packet engine 152 shown in FIG. 1B), by a TCP/IP stack such as the TCP/IP stack 154 shown in FIG. 1B), and the like, instead of or in addition to the processor 320.

As another example, FIG. 3B illustrates a process 300B of a state of the Ethernet port 311 changing. In this example, the Ethernet port 311 goes from down to up (active) in response to a new device being connected to the Ethernet port 311. In response, the processor 320 may launch a DHCP client 321 and determine a link state 322 of the Ethernet port. According to various embodiments, each Ethernet port may be configured to auto-detect its link state, where the link state may include a connection to the Internet or a connection to a local area network (LAN). In this example, if the processor 320 determines that an IP address is obtained and a default gateway is provided, then that Ethernet port 311 is determined to have Internet connectivity.

FIG. 3C illustrates a process 300C of auto-configuring the Ethernet port 311 based on determining that the Ethernet port 311 is connected to an Internet link. In this example, the processor 320 may enable features 323 for the Ethernet port 311 such as Network Address Translation (NAT), ARP scanning (to find all devices on the network), Internet connection monitoring, route announcement, and the like. Also, various security features may be enabled or disabled as required.

However, if a gateway is not provided or if the gateway is the router's own IP address (as would be the case with an external DHCP server), then the Ethernet port 311 is determined be connected to a LAN interface and not the Internet. For example, if the processor 320 is unable to obtain an IP address via DHCP after a reasonable period of time, the processor 320 may determine that the Ethernet port 311 is not connected to the Internet but is instead connected to a LAN as shown in FIG. 3D.

For example, FIG. 3D illustrates a process 300D of auto-configuring the Ethernet port 311 based on a LAN connection. In this example, there is no Internet connect and no IP addresses is assigned. Instead, the processor may choose an IP address and enable a DHCP server 324 for the Ethernet port 311 and disable the DHCP client 321. The IP address can be chosen by the DHCP server 324 based on prior observations of Ethernet port 311, for example, based on whether there had previously been another router connected or the like. Furthermore, feature 325 may be enabled and/or disabled in response to the link state being the LAN instead of the Internet link.

In FIGS. 3B-3D, the link state may be assumed to be for an IPv4 protocol. It should be appreciated that auto-configuration may be performed for IPv6 protocol as well, and that such auto-configuration may involve different steps. For example, the processor 320 may enable features for the IPv6 protocol, including Router Solicitation and Advertisement, DHCPv6 client and server, and address assignment via SLAAC, Prefix Delegation, or Unique Local Address.

As another example, if an Ethernet port goes from down to up, there is only one Ethernet interface that is up, the Ethernet interface appears to be connected to the Internet (i.e., has obtained a default route), and the interface has an RFC 1918 IP address, then the processor 320 may determine that the Ethernet port is private management and may enable or otherwise allow incoming management access.

FIG. 3E illustrates a process 300E of a change in a state of the Ethernet port 312 of the router 310. In this example, the Ethernet port 312 changes from down (inactive) to up (active) in response to a virtual private network (VPN) connection. In response to the VPN connection changing to up, the processor 320 may automatically configure the Ethernet port 312 by enabling a dynamic address assignment 326 and a route announcement protocol 327.

FIG. 3F illustrates a process 300F of a change in state of the Ethernet port 311, and an auto-configuration performed in response to the change in the state. In this example, the previously active state (up) of the Ethernet port goes down (is inactive). For example, maybe the device has lost its connection, has gone down, the network has gone down, or the like. In response, the processor 320 may automatically disable the link state 322 (e.g., LAN link), the DHCP server 324, and the features 325 previously enabled, in response.

FIG. 4 illustrates a process 400 of analyzing manual changes to a routing apparatus according to example embodiments. Referring to FIG. 4, a router 420 provides a software application that enables access to router configuration settings 424. In the example embodiments, the router 420 enables a mobile application 414 to externally modify the router configuration settings 424 within the router 420. Here, the user device 410 may download and install the mobile application 414 from a marketplace, or the like. The mobile application 414 may provide a settings menu, window, controls, etc. which are displayed on a user interface 412 of the user device 410, and which enable a user to manually configure the router configuration settings 424 of the router 420 in an external manner.

According to various embodiments, the auto-configuration logic of the router 420 may determine whether or not the settings changed by the user are appropriate. For example, a processor 422 may use an AI model, a machine learning model, rules, or the like, and determine whether such changes are appropriate or not. If not, the processor 422 may undo the changes to the router configuration settings and/or the Ethernet port made by the user.

Figure 5A:
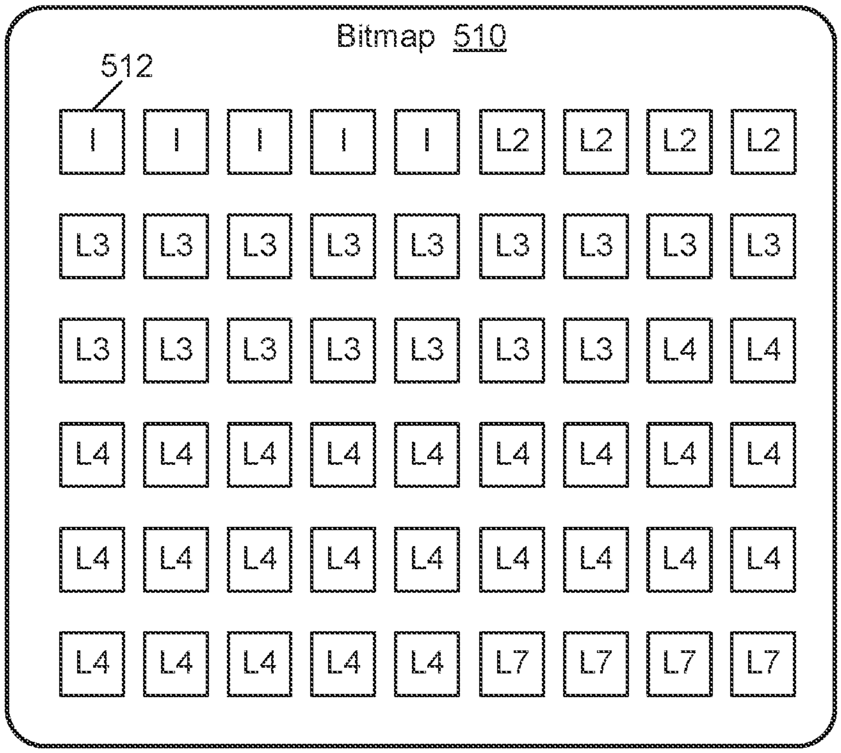

FIGS. 5A-5C are diagrams illustrating a process of analyzing a packet and updating a bitmap based on metadata according to example embodiments. For example, FIG. 5A illustrates a view 500A of a bitmap 510 that may be attached to a packet that is received by a router as described herein. In this example, the bitmap 510 includes a plurality of cells 512 which each represent a unique metadata attribute of the packet. You can think of each cell as a flag or bit flag that identifies whether the metadata attribute is associated with the packet or not, depending on the value of the flag stored in the cell.

The metadata attributes represented by the cells in the bitmap 510 may include different layering protocols as well as different internal protocols. For example, the cells in the bitmap 510 may be used to represent internal attribute such as whether the packet is head to the Internet, whether the packet is head toward a LAN, whether the packet came from an untrusted source directly, whether the packet should be discarded, whether the packet wants a network address translation, and the like. As another example, the cells in the bitmap 510 may be used to represent layer 2 protocol attributes such as whether the packet is not multicast/not to the MAC address of the router, whether the packet needs ARP, whether the source is multicast or broadcast, whether the destination is multicast or broadcast, and the like.

As another example, the cells in the bitmap 510 may be used to represent layer 3 protocol attributes such as whether the packet is IPv4, whether the packet is IPv6, whether the packet is fragmented, whether the source IP address is zero, whether the destination IP address is the router's IP address, whether the source IP address is the router's IP address, whether the source or destination is LINKLOCAL, whether an IPv6 header contains a hop-by-hop header, whether the IP protocol is TCP, whether the IP protocol is UDP, whether the IP protocol is ICMP, whether the IP protocol is ICMPv6, whether the IP protocol is ESP, whether the IP protocol is GRE, whether the packet needs a new checksum, and whether the packet is allowed as an unsolicited incoming packet to MY_IP.

As another example, cells in the bitmap 510 may be used to represent layer 4 protocol attributes such as whether the destination port is DNS, whether the destination port is DHCP server, whether the destination port is DHCP client, whether the destination port is DHCPv6 server, whether the destination port is DHCPv6 client, whether the packet is an ICMP echo request, whether the packet is an ICMP timestamp request, whether the packet is an ICMP timestamp reply, whether the packet is an ICMP unreachable, whether the packet is an ICMP time exceed, whether the packet is an ICMP parameter problem, whether the packet is an ICMP source quench, whether the packet is an ICMPv6 NDP, whether the packet is an ICMPv6 NDP router solicit, whether the packet is an ICMPv6 NDP router advertisement, whether the packet is an ICMPv6 NDP neighbor solicit, whether the packet is an ICMPv6 NDP neighbor advertisement, whether the packet is an ICMPv6 echo request, whether the packet is an ICMPv6 echo reply, whether the packet is an ICMPv6 unreachable, whether the packet is an ICMPv6 packet too big, whether the packet is an ICMPv6 time exceeded, whether the packet is an ICMPv6 parameter problem, whether the packet is an ICMPv6 MLD packet, whether the packet is a SSDP announcement, whether the packet is headed toward a PPTP destination port, whether the packet is headed to a Wireguard destination port, whether the packet is headed to a mDNS destination port, and the like.

As another example, bits may be used to represent layer 7 protocol attributes such as whether the packet contains an HTTP GET command, whether the packet belongs to a TLS connection, whether the packet contains a TLS client HELLO, and whether the packet contains an IKE message.

The bitmap 510 may be attached to a packet and may be used by a router to perform various metadata checks on the packet for various metadata attributes. The metadata attributes may be internal metadata attributes, layer 2 attributes, layer 3 attributes, layer 4 attributes, layer 7 attributes, and the like. For example, FIG. 5B illustrates a process 500B of a router 520 analyzing a packet 530 for that is received via an ingress port (Ethernet port 521). In this example, the packet 530 includes the bitmap 510 attached thereto.

In response to receiving the packet 530, a processor 522 may analyze a routing table 524 for metadata attributes of the packet 530. As another example, the processor 522 may analyze the packet 530 itself for metadata attributes of the packet 530. For example, the metadata attributes may include a source, a destination, a type of the packet (e.g., IPv4, IPv6, etc.), IP protocols that are being used with the packet 530, DHCP data, the purpose of the packet (e.g., request, response, unreachable, advertisement, reply, etc.) and the like. Here, the processor 522 may mark flags within the bitmap 510 based on which metadata attributes are identified. The marking process may include adding a bit flag to a cell to indicate inclusion of a particular metadata attribute. Some cells may be marked and some will be blank. The markings may be analyzed by the processor 522 to make decisions on the packet 530.

According to various embodiments, the processor 522 may execute multiple tests/checks on the packet 530 at the same time (i.e., simultaneously), whereas a traditional stack may just check one metadata attribute at a time. The routing table 524 helps make determinations like which direction the packet is going (toward the Internet or from the Internet). The routing table 524 can identify if the packet needs to be transmitted. There are metadata attributes of the packet 530 that can be checked at the same time including layer two, layer three, layer four, etc. By using a bitmap, the router can simultaneously check a bunch of flags at once. However, the bitmap 510 may not be appropriate for a general/traditional router which performs thousands of different metadata checks for Internet tracking and security reasons. A bitmap in such a case would be too large. However, in the example embodiments, a small list (e.g., 65-70, etc.) metadata attributes are checked enabling the bitmap to be of a small such as a 128-bit register, a 256-bit register, or the like. It should be appreciated that the register is 128 bits in size, and can be any other size as desired.

For example, FIG. 5C illustrates a process 500C of the processor 522 determining whether or not to drop the packet 530 based on the flags that are present in the bitmap 510. In this case, the processor 522 may determine to drop the packet 530 if enough security issues exist, or if specific security issues exist, as identified from the metadata attributes in the bitmap 510. As another example, the processor 522 may determine to transfer the packet 530 to a next hop based on the metadata attributes identified in the bitmap 510.

Figure 6:
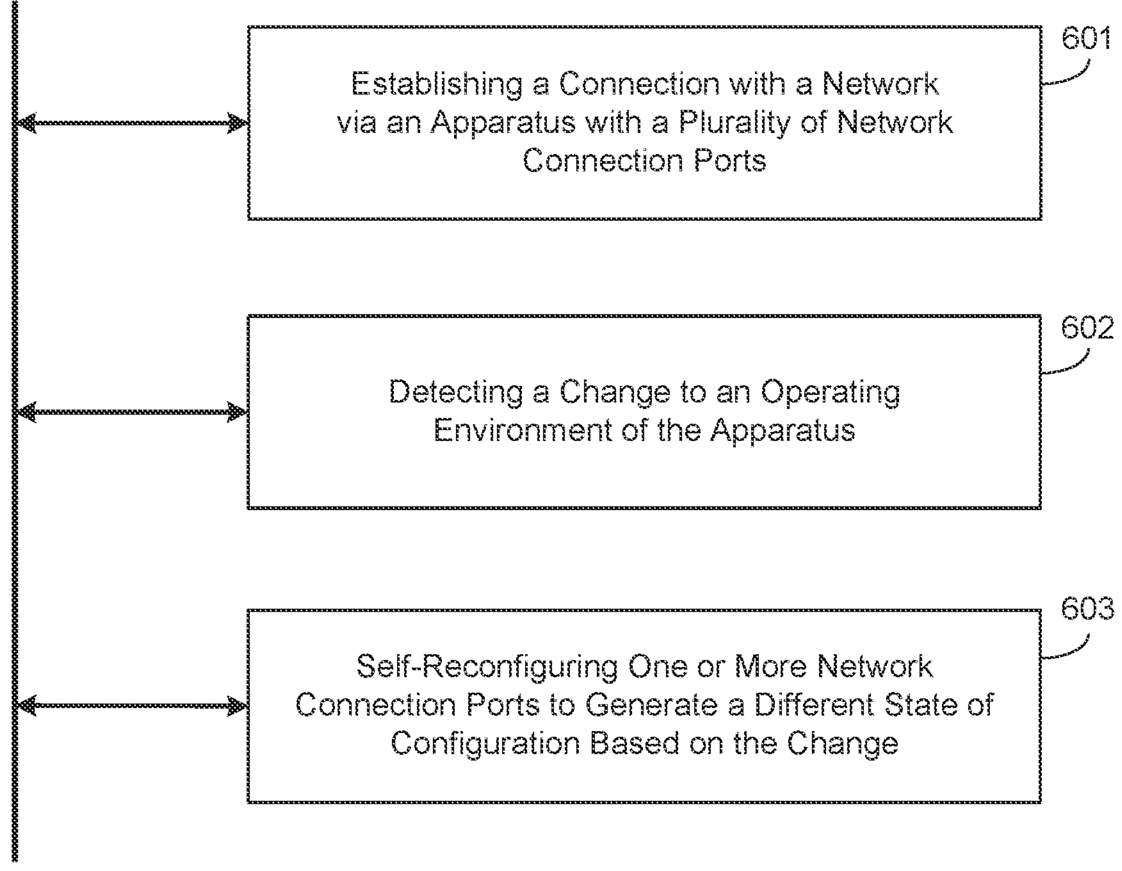
FIG. 6 is a diagram illustrating a method of a routing apparatus self-reconfiguring a state thereof according to example embodiments.

FIG. 6 illustrates a method 600 of a routing apparatus self-reconfiguring a state thereof according to example embodiments. For example, the method 600 may be performed the router shown in any of the examples herein. Referring to FIG. 6, in 601, the method may include establishing a connection with a network via an apparatus (e.g., a routing apparatus, router, switch, etc.) which includes a plurality of network connection ports. According to various embodiments, when connected to a network, each network connection port may automatically determine a state of the respective port, and each network connection port may provide an internet connection and a local area network (LAN) connection.

In 602, the method may include detecting a change to an operating environment of the apparatus. In 603, the method may include self-reconfiguring one or more network connection ports from among the plurality of network connection ports to generate a different state of configuration based on the detected change to the operating environment.

In some embodiments, the detecting may include detecting that a state of a network connection port has changed from inactive to active, and the self-reconfiguring comprises enabling a dynamic host configuration protocol (DHCP) client for the network connection port and determining a link state of the network connection port. In some embodiments, the detecting may include determining the link state of the network connection port is an Internet connection, and the self-reconfiguring comprises enabling one or more of Network Address Translation (NAT), address resolution protocol (ARP) scanning, Internet connection monitoring, and route announcement.

In some embodiments, the detecting may include determining the link state of the network connection port is a LAN connection, and the self-reconfiguring comprises deactivating the DHCP client for the network connection port and enabling a DHCP server for the network connection port. In some embodiments, the method may further include receiving a packet from an Internet service provider (ISP) via a network connection port and querying the ISP to detect a change to a state of the network connection port, wherein the self-reconfiguring comprises self-reconfiguring the network connection port based on a response from the ISP. In some embodiments, the detecting may include detecting that a network connection port has changed from an active state to an inactive state, and the self-reconfiguring may include disabling one or more enabled routing features of the network connection port.

In some embodiments, the detecting may include detecting that a virtual private network (VPN) connected to a network connection port has changed a state from inactive to active, and the self-reconfiguring may include enabling a dynamic address assignment and a route announcement protocol for the network connection port. In some embodiments, the detecting may include detecting that a network connection port has changed from an inactive state to an active state that uses a private Internet Protocol (IP) address, and the self-reconfiguring may include enabling incoming management access to the network connection port. In some embodiments, the detecting may include detecting manual changes to a network connection port performed by a user device, and the method further comprises determining that the manual changes are incorrect and undoing the manual changes to the network connection port performed by the user device.

Figure 7:
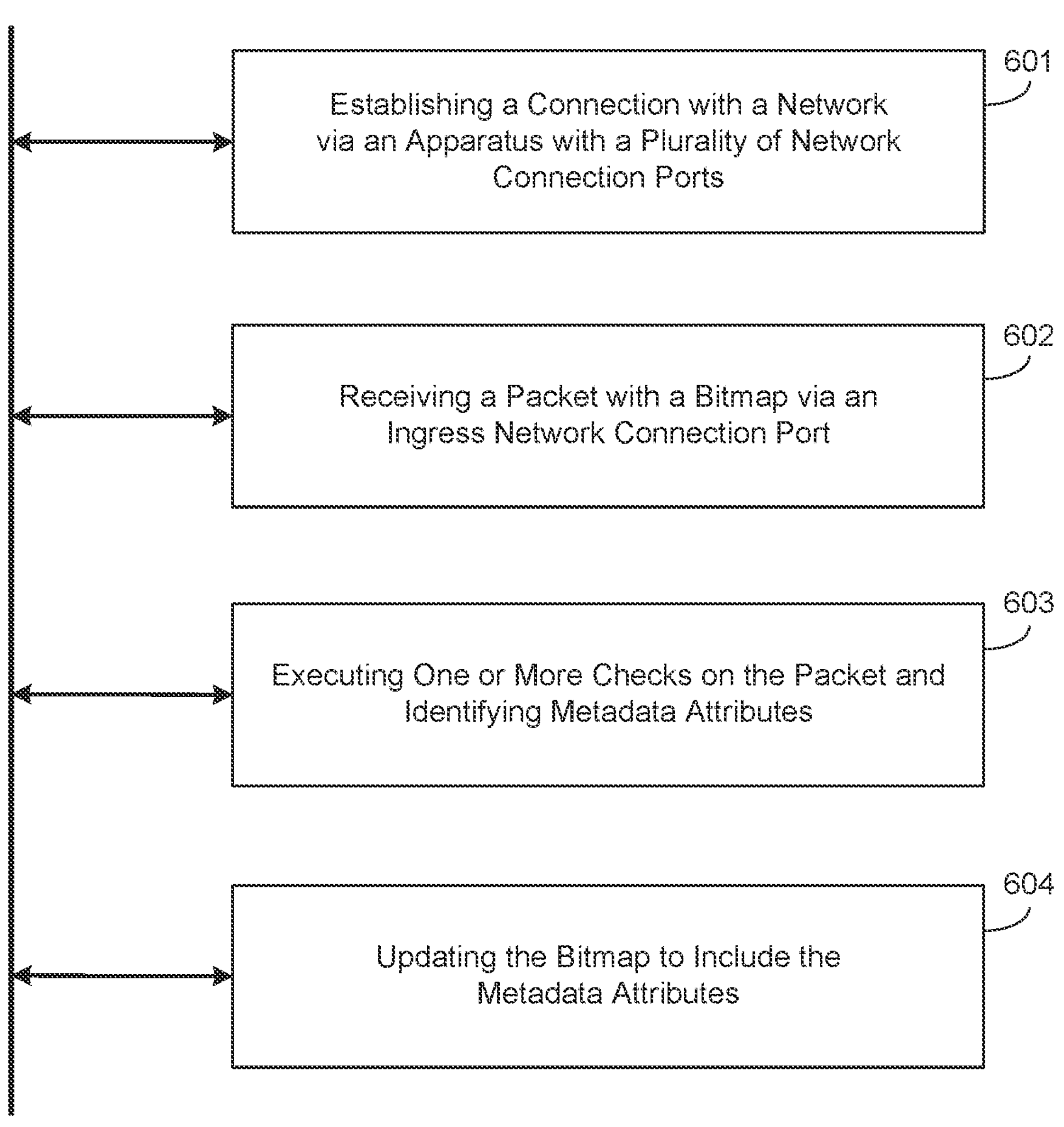
FIG. 7 is a diagram illustrating a method of routing performed based on a bitmap according to example embodiments

FIG. 7 illustrates a method 700 of a routing apparatus self-reconfiguring a state thereof according to example embodiments. For example, the method 700 may be performed the router shown in any of the examples herein. Referring to FIG. 7, in 701, the method may include establishing a connection with a network via an apparatus comprising a plurality of network connection ports, wherein each network connection port is configured to provide an internet connection or an internal local area network connection. In 702, the method may include receiving a packet comprising a bitmap via an ingress network connection port of the plurality of network connection ports. In 703, the method may include executing one or more checks associated with the packet and identifying metadata attributes of the packet. In 704, the method may include updating the bitmap to include the metadata attributes of the packet.

In some embodiments, the executing may include simultaneously executing checks of data link layer attributes, network layer attributes, and transport layer attributes of the packet, and the updating may include updating the bitmap with bit values based on results of the simultaneously executed checks. In some embodiments, the bitmap may include a 128-bit array and is attached to the packet. In some embodiments, the executing may include checking a routing table to identify a direction of the packet and the updating comprises updating the bitmap to identify the direction of the packet.

In some embodiments, the executing may include parsing the packet to identify Internet Protocol (IP) attributes of the packet and the updating may include updating the bitmap to identify the IP attributes of the packet. In some embodiments, the executing may include parsing the packet to identify dynamic host configuration protocol (DHCP) attributes of the packet and the updating may include updating the bitmap to identify the DHCP attributes of the packet. In some embodiments, the executing may include identifying that the packet contains a transport layer security (TLS) handshake and the updating may include updating the bitmap to indicate the packet contains the TLS handshake. In some embodiments, the method may further include determining that the packet should be discarded based on the metadata attributes of the packet and the updating comprises updating the bitmap with a flag that indicates the packet should be discarded.

The above embodiments may be implemented in hardware, in a computer program executed by a processor, in firmware, or in a combination of the above. A computer program may be embodied on a non-transitory computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of at least one of an apparatus, a method, and a computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the capabilities of the routing apparatus shown and described with respect to various figures can be performed by one or more processors of the routing apparatus, or other components.

One skilled in the art will appreciate that a "system" could be embodied as a personal computer, a server, a console, a personal digital assistant (PDA), a cell phone, a tablet computing device, a smartphone, a smart-wearable device, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:

a plurality of network connection ports, wherein each network connection port is configured to provide an internet connection or an internal local area network connection; and a processor configured to receive a packet comprising a bitmap via an ingress network connection port of the plurality of network connection ports, execute one or more checks associated with the packet to identify metadata attributes of the packet, wherein the metadata attributes include one or more of packet type, packet priority, security level, and routing information, perform a discard determination to determine whether the packet should be discarded based on the metadata attributes, and update the bitmap to include the metadata attributes of the packet and a discard indicator based on the discard determination.

2. The apparatus of claim 1, wherein the processor is configured to simultaneously execute checks of data link layer attributes, network layer attributes, and transport layer attributes of the packet, and update the bitmap with bit values based on results of the simultaneously executed checks.

3. The apparatus of claim 1, wherein the bitmap comprises a 128-bit array and is attached to the packet.

4. The apparatus of claim 1, wherein the processor is configured to check a routing table to identify a direction of the packet and update the bitmap to identify the direction of the packet.

5. The apparatus of claim 1, wherein the processor is configured to parse the packet to identify Internet Protocol (IP) attributes of the packet and update the bitmap to identify the IP attributes of the packet.

6. The apparatus of claim 1, wherein the processor is configured to parse the packet to identify dynamic host configuration protocol (DHCP) attributes of the packet and update the bitmap to identify the DHCP attributes of the packet.

7. The apparatus of claim 1, wherein the processor is configured to identify that the packet contains a transport layer security (TLS) handshake and update the bitmap to indicate the packet contains the TLS handshake.

8. The apparatus of claim 1, wherein the processor is configured to determine that the packet should be discarded based on the metadata attributes of the packet and update the bitmap with a flag that indicates the packet should be discarded.

9. A method, comprising:

establishing a connection with a network via an apparatus comprising a plurality of network connection ports, wherein each network connection port is configured to provide an internet connection or an internal local area network connection;

receiving a packet comprising a bitmap via an ingress network connection port of the plurality of network connection ports;

executing one or more checks associated with the packet and identifying metadata attributes of the packet, wherein the metadata attributes include one or more of packet type, packet priority, security level, and routing information;

performing a discard determination to determine whether the packet should be discarded based on the metadata attributes; and updating the bitmap to include the metadata attributes of the packet and a discard indicator based on the discard determination.

10. The method of claim 9, wherein the executing comprises simultaneously executing checks of data link layer attributes, network layer attributes, and transport layer attributes of the packet, and the updating comprises updating the bitmap with bit values based on results of the simultaneously executed checks.

11. The method of claim 9, wherein the bitmap comprises a 128-bit array and is attached to the packet.

12. The method of claim 9, wherein the executing comprises checking a routing table to identify a direction of the packet and the updating comprises updating the bitmap to identify the direction of the packet.

13. The method of claim 9, wherein the executing comprises parsing the packet to identify Internet Protocol (IP) attributes of the packet and the updating comprises updating the bitmap to identify the IP attributes of the packet.

14. The method of claim 9, wherein the executing comprises parsing the packet to identify dynamic host configuration protocol (DHCP) attributes of the packet and the updating comprises updating the bitmap to identify the DHCP attributes of the packet.

15. The method of claim 9, wherein the executing comprises identifying that the packet contains a transport layer security (TLS) handshake and the updating comprises updating the bitmap to indicate the packet contains the TLS handshake.

16. The method of claim 9, wherein the method further comprises determining that the packet should be discarded based on the metadata attributes of the packet and the updating comprises updating the bitmap with a flag that indicates the packet should be discarded.

17. A non-transitory computer-readable storage medium comprising instructions which when executed by a computer cause a processor to perform:

establishing a connection with a network via an apparatus comprising a plurality of network connection ports, wherein each network connection port is configured to provide an internet connection or an internal local area network connection;

receiving a packet comprising a bitmap via an ingress network connection port of the plurality of network connection ports;

executing one or more checks associated with the packet and identifying metadata attributes of the packet, wherein the metadata attributes include one or more of packet type, packet priority, security level, and routing information;

performing a discard determination to determine whether the packet should be discarded based on the metadata attributes; and updating the bitmap to include the metadata attributes of the packet and a discard indicator based on the discard determination.

18. The non-transitory computer-readable storage medium of claim 17, wherein the executing comprises simultaneously executing checks of data link layer attributes, network layer attributes, and transport layer attributes of the packet, and the updating comprises updating the bitmap with bit values based on results of the simultaneously executed checks.

19. The non-transitory computer-readable storage medium of claim 17, wherein the executing comprises parsing the packet to identify Internet Protocol (IP) attributes of the packet and the updating comprises updating the bitmap to identify the IP attributes of the packet.

20. The non-transitory computer-readable storage medium of claim 17, wherein the executing comprises checking a routing table to identify a direction of the packet and the updating comprises updating the bitmap to identify the direction of the packet.

* * * * *